United States Patent
Yang et al.

(10) Patent No.: US 11,388,681 B2
(45) Date of Patent: Jul. 12, 2022

(54) DYNAMIC INTERFERENCE MANAGEMENT IN NR DYNAMIC TDD SYSTEMS

(71) Applicant: IDAC Holdings, Inc., Wilmington, DE (US)

(72) Inventors: Jiaxin Yang, Montreal (CA); Benoit Pelletier, Roxboro (CA); Paul Marinier, Brossard (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/495,789

(22) PCT Filed: Mar. 16, 2018

(86) PCT No.: PCT/US2018/022830
§ 371 (c)(1),
(2) Date: Sep. 19, 2019

(87) PCT Pub. No.: WO2018/175224
PCT Pub. Date: Sep. 27, 2018

(65) Prior Publication Data
US 2020/0053661 A1 Feb. 13, 2020

Related U.S. Application Data

(60) Provisional application No. 62/474,857, filed on Mar. 22, 2017.

(51) Int. Cl.
*H04W 52/24* (2009.01)
*H04W 52/28* (2009.01)
(Continued)

(52) U.S. Cl.
CPC ........ *H04W 52/243* (2013.01); *H04B 17/327* (2015.01); *H04W 52/146* (2013.01);
(Continued)

(58) Field of Classification Search
CPC ............ H04W 52/243; H04W 52/146; H04W 72/042; H04W 72/046; H04W 72/10;
(Continued)

(56) References Cited

U.S. PATENT DOCUMENTS

2009/0019150 A1 1/2009 Li et al.
2009/0170542 A1 7/2009 Chen et al.
(Continued)

FOREIGN PATENT DOCUMENTS

CN 101689911 A 3/2010
CN 102325327 A 1/2012
(Continued)

OTHER PUBLICATIONS

3rd Generation Partnership Project (3GPP), R1-1702649, "Dynamic TDD Interference Management Considerations", Qualcomm Incorporated, 3GPP TSG RAN WG1 NR # 88, Athens, Greece, Feb. 13-17, 2017, pp. 1-8.

*Primary Examiner* — Philip Sobutka
(74) *Attorney, Agent, or Firm* — Condo Roccia Koptiw LLP

(57) ABSTRACT

Systems, methods, and instrumentalities are disclosed for dynamic interference management in NR dynamic TDD systems. A first WTRU (e.g., an aggressor WTRU) may receive downlink control information (DCI). The first WTRU may determine a first priority associated with the first WTRU. The first WTRU may determine the first priority based on one or more of the DCI or a logical channel prioritization. The first WTRU may receive an interference measurement reference signal (IMRS) transmission from a second WTRU (e.g., a victim WTRU). The first WTRU may measure the received IMRS transmission. The first WTRU may determine a second priority associated with a downlink payload of the second WTRU. The first WTRU may determine that the second priority is greater than the first priority.

(Continued)

The first WTRU may adjust an uplink transmission power of the first WTRU, for example, based on the first priority and the second priority.

16 Claims, 7 Drawing Sheets

(51) Int. Cl.
| | |
|---|---|
| *H04W 72/10* | (2009.01) |
| *H04B 17/327* | (2015.01) |
| *H04W 52/14* | (2009.01) |
| *H04W 72/04* | (2009.01) |

(52) U.S. Cl.
CPC ....... *H04W 52/281* (2013.01); *H04W 72/042* (2013.01); *H04W 72/046* (2013.01); *H04W 72/10* (2013.01)

(58) Field of Classification Search
CPC ............. H04W 52/281; H04W 52/244; H04W 52/383; H04B 17/327
See application file for complete search history.

(56) References Cited

U.S. PATENT DOCUMENTS

| | | |
|---|---|---|
| 2009/0197590 A1 | 8/2009 | Borran et al. |
| 2011/0019776 A1* | 1/2011 | Zhang ............... H04L 5/0048 375/340 |
| 2011/0292817 A1 | 12/2011 | Leconte et al. |
| 2013/0114562 A1* | 5/2013 | Seo ................. H04W 52/16 370/329 |
| 2014/0140296 A1 | 5/2014 | Choi et al. |
| 2015/0282001 A1* | 10/2015 | Kwak ............. H04B 7/0695 370/229 |
| 2018/0041889 A1* | 2/2018 | Chen ............. H04W 92/18 |
| 2018/0199351 A1 | 7/2018 | Ro et al. |
| 2018/0242264 A1* | 8/2018 | Pelletier ........... H04W 52/346 |
| 2019/0373635 A1* | 12/2019 | Yang ............... H04B 7/0408 |
| 2020/0245257 A1 | 6/2020 | Pelletier et al. |

FOREIGN PATENT DOCUMENTS

| | | | |
|---|---|---|---|
| CN | 102918913 A | 2/2013 | |
| CN | 104202810 A | 12/2014 | |
| CN | 105263186 A | 1/2016 | |
| CN | 106134263 A | 11/2016 | |
| EP | 1435747 A1 | 7/2004 | |
| WO | 2010/091425 A2 | 8/2010 | |
| WO | 2015/080486 A1 | 6/2015 | |
| WO | WO-2015116866 A1 * | 8/2015 | ........ H04W 72/0473 |
| WO | 2016/181547 A1 | 11/2016 | |
| WO | 2017/035464 A1 | 3/2017 | |

* cited by examiner

DYNAMIC INTERFERENCE MANAGEMENT IN NR DYNAMIC TDD SYSTEMS

CROSS REFERENCE TO RELATED APPLICATIONS

This application is the National Stage entry under 35 U.S.C. § 371 of Patent Cooperation Treaty Application PCT/US2018/022830, filed Mar. 16, 2018, which claims priority to U.S. provisional patent application No. 62/474,857, filed Mar. 22, 2017, which is incorporated herein by reference in its entirety.

BACKGROUND

Mobile communications continue to evolve. A fifth generation may be referred to as 5G. A previous (legacy) generation of mobile communication may be, for example, fourth generation (4G) long term evolution (LTE). Mobile wireless communications implement a variety of radio access technologies (RATs), such as New Radio (NR) or 5G flexible RAT. Use cases for NR may include, for example, extreme Mobile Broadband (eMBB), Ultra High Reliability and Low Latency Communications (URLLC) and massive Machine Type Communications (mMTC).

SUMMARY

Systems, methods, and instrumentalities are disclosed for dynamic interference management in NR dynamic TDD systems. A first wireless transmit/receive unit (WTRU) (e.g., an aggressor WTRU) may receive downlink control information (DCI). The first WTRU may determine a first priority associated with the first WTRU. The first WTRU may determine the first priority based on one or more of the DCI or a logical channel prioritization (e.g., based on a logical channel priority associated with data to be transmitted by the WTRU). The first WTRU may receive an interference measurement reference signal (IMRS) transmission from a second WTRU (e.g., a victim WTRU). The first WTRU may determine an identity of the second WTRU and/or one or more characteristics of the second WTRU based on the received IMRS transmission. The first WTRU may measure the received IMRS transmission. The first WTRU may determine a reference signal received power (RSRP) associated with the second WTRU, for example, based on the measurement of the IMRS transmission.

The first WTRU may determine a second priority associated with a payload of the second WTRU (e.g., a downlink payload). The second priority associated with the downlink payload may be indicated in the received IMRS transmission. The first WTRU may determine that the second priority is greater than the first priority. The first WTRU may adjust an uplink transmission power of the first WTRU, for example, based on the first priority and the second priority. The first WTRU may reduce the uplink transmission power when the second priority is greater than the first priority. An amount that the uplink transmission power is reduced may be based on the measured IMRS transmission and/or a receive power that may be determined by measuring the IMRS transmission.

DETAILED DESCRIPTION

Figure 1A:
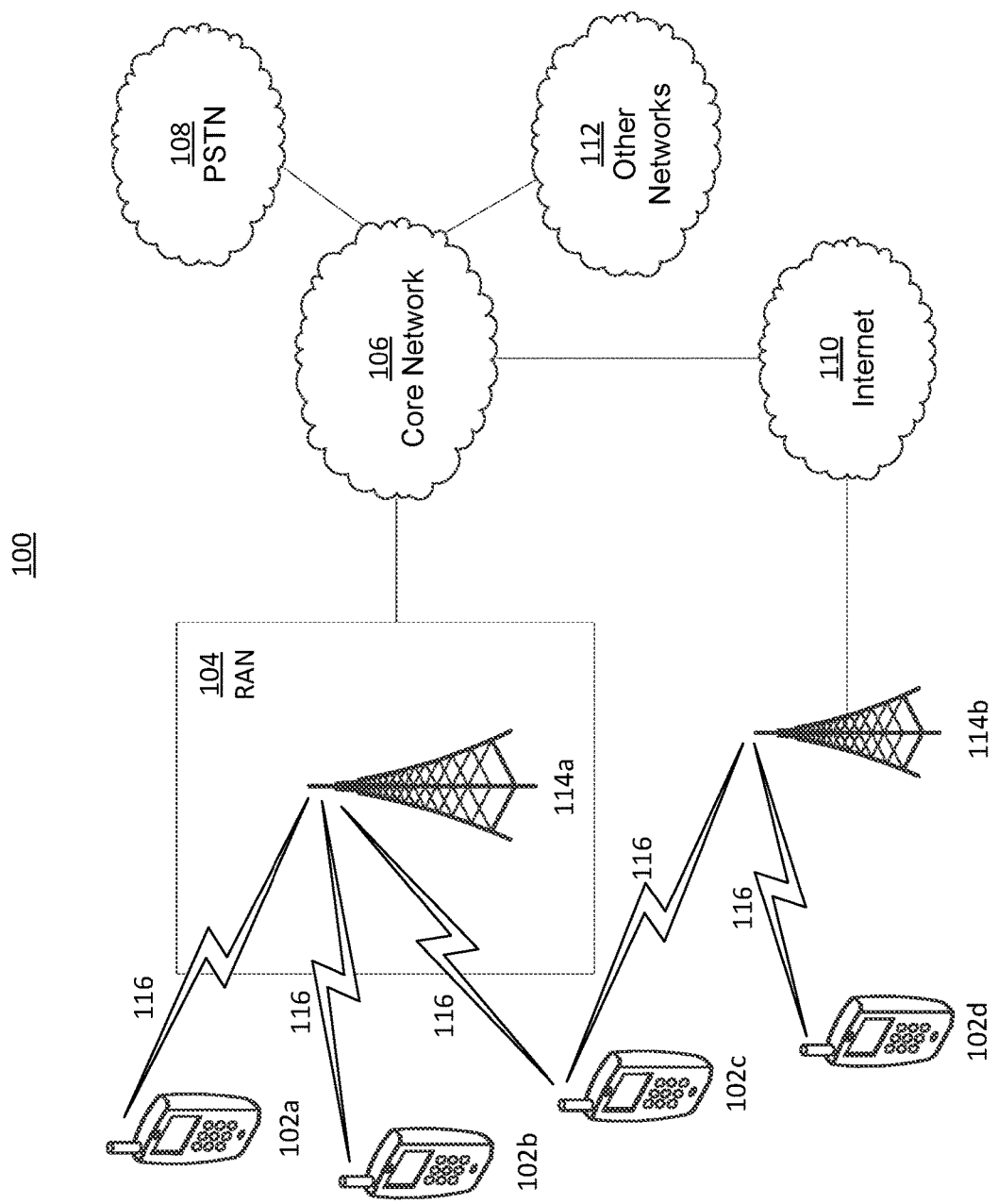
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
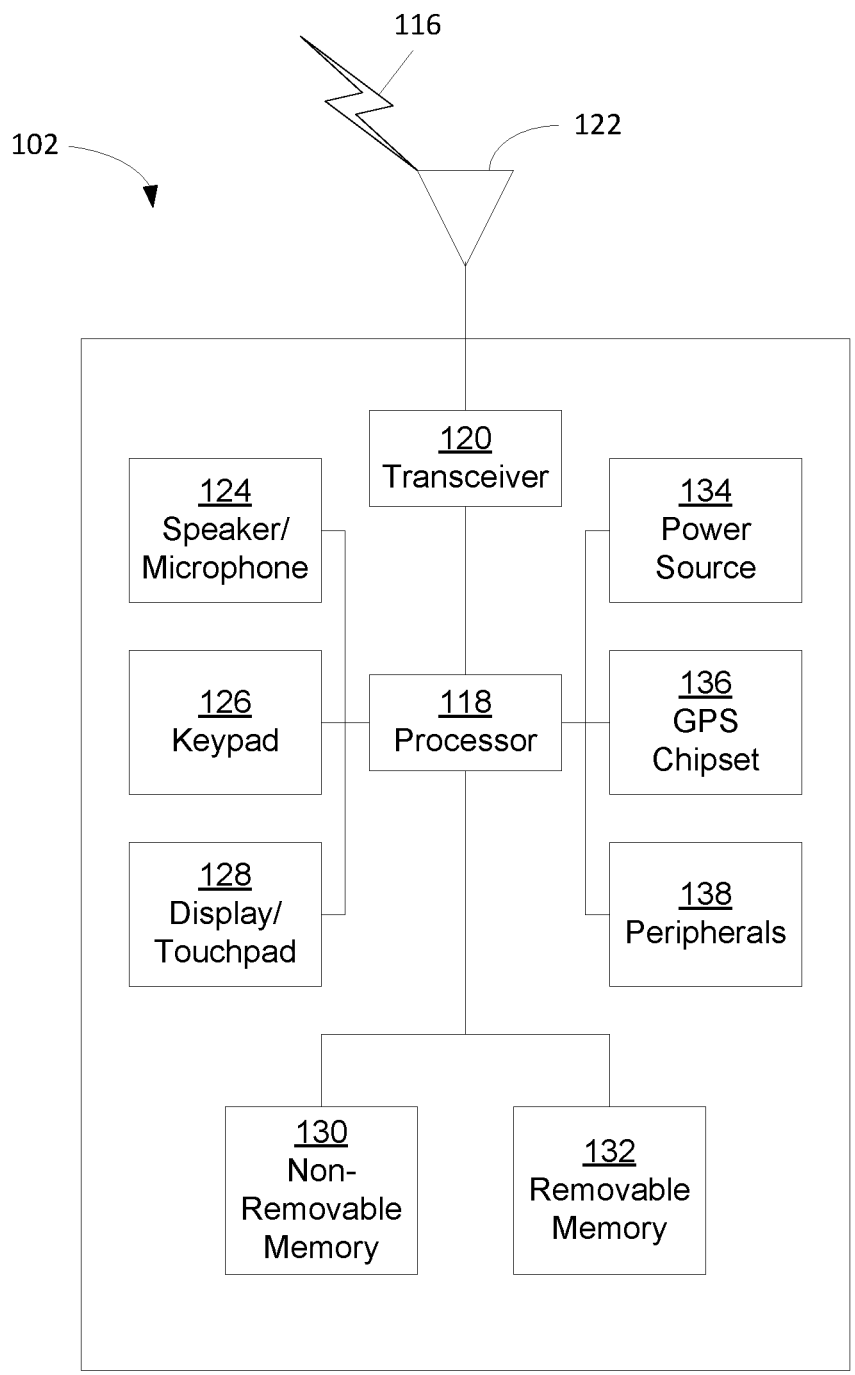
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
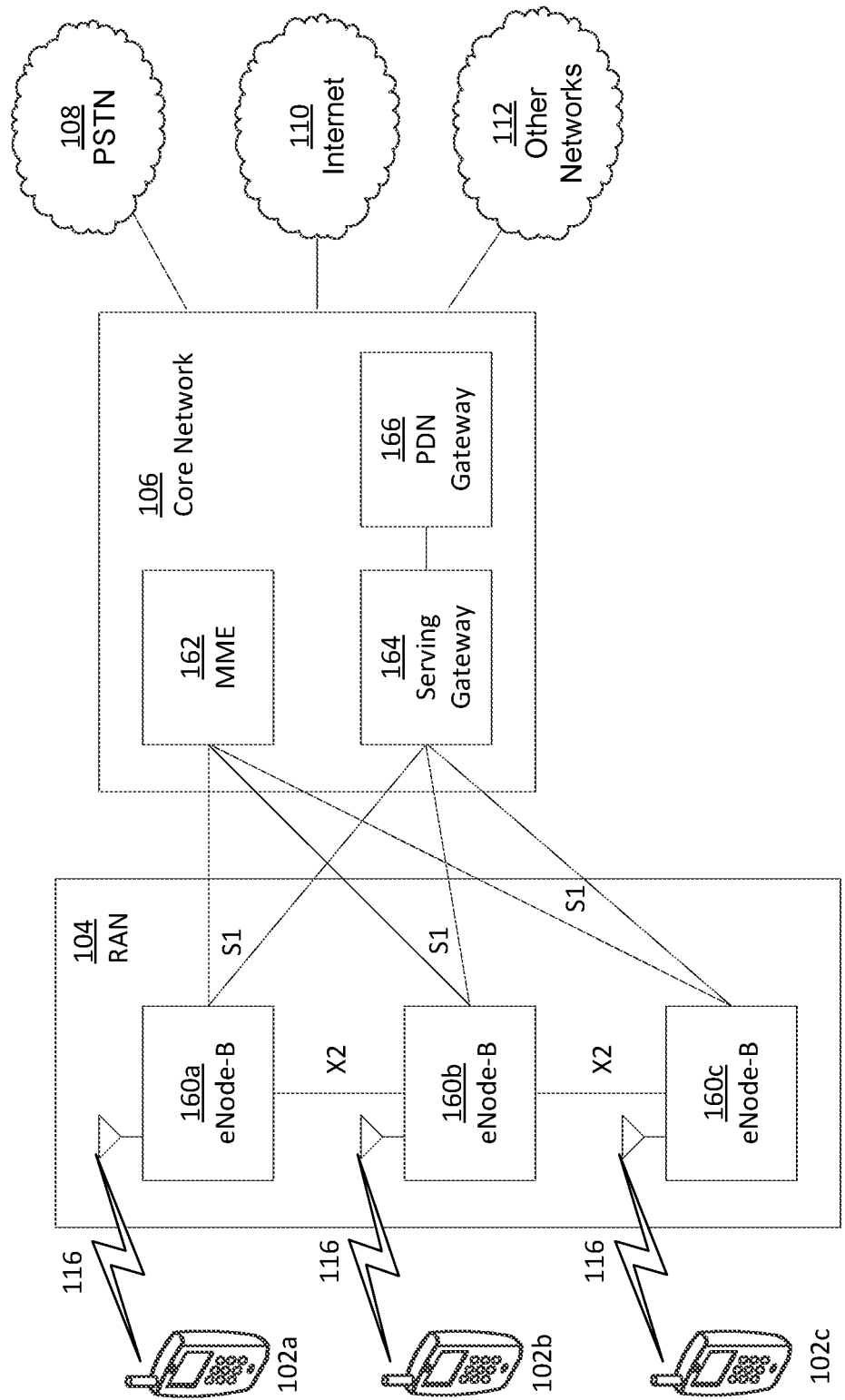
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
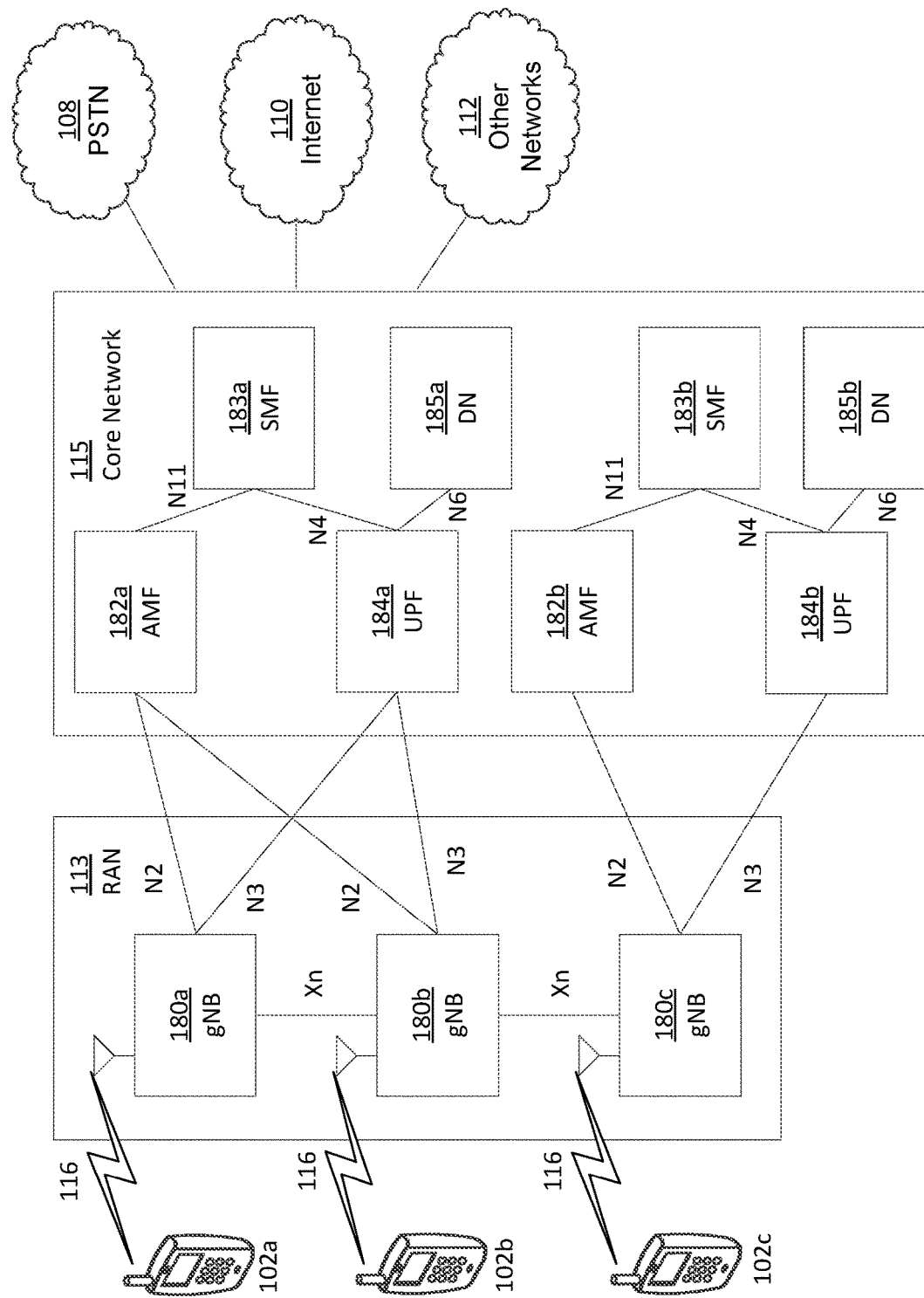
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Cellular networks may be deployed, for example, based on different spectrum allocation schemes, such as Frequency Division Duplexing (FDD) in paired spectrum and Time Division Duplexing (TDD) in unpaired spectrum. Some networks may implement both FDD and TDD schemes and/or a hybrid thereof. A next generation cellular network, e.g., New Radio (NR), may be deployed, for example, in a higher frequency band than Long-Term Evolution (LTE), which may have significantly wider frequency bandwidth. A wider bandwidth at higher frequency may allow of support of a number of services, such as enhanced Mobile Broadband (eMBB), ultra-high reliability and low latency communications (URLLC) and massive machine type communications (mMTC). NR may support stand-alone unpaired spectrum allocations, for example where the uplink (UL) and downlink (DL) operating on the same carrier frequency (e.g., in TDD manner), rather than or in addition to paired spectrum allocation (e.g., FDD). Contiguous frequency bandwidth may be available for NR. Wider bandwidth may be used with lower spectrum waste, for example, by duplex spacing. NR traffic may be highly data centric and may (e.g., often) be asymmetric across different cells. In an example, a first cell may be DL dominant while one or more neighboring cells may be UL dominant. TDD deployment may (e.g., in this case) benefit from more dynamic DL/UL resource allocation, e.g., dynamic TDD, which may be adapted to the variation of asymmetry between a UL and DL traffic load.

TDD scheme variation may be supported but relatively less dynamic in LTE operation (e.g., a limited extent dynamic TDD in LTE). In an example, a TDD UL-DL configuration of LTE may determine how 10 subframes in a frame may be divided between DL and UL. For example, there may be 7 TDD frame configurations that may range from a DL-dominant resource distribution ratio of 9:1 to UL-dominant ratio of 2:3. Neighboring cells may be configured with the same DL/UL configurations, for example, to avoid (e.g., severe) interference between different transmission directions across different cells. Common UL/DL configuration may make it difficult to change a DL/UL configuration dynamically according to a time-varying data traffic pattern. An LTE system may, for example, assume that a DL/UL configuration may be (e.g., relatively) static/semi-static. Enhancements to LTE TDD for DL-UL interference management and traffic adaption (eIMTA) such as cell clustering, scheduling coordination, enhanced interference cancellation interference coordination (eICIC), etc. may deal with potential cross-link interference (e.g., due to use of a dynamic TDD by different cells). However, these enhancements to TDD operation may have limitations and/or may be with respect to NR. For example, eIMTA enhancements may not support fast DL/UL adaption to provide services with a low latency requirement. More robust and efficient interference mitigation schemes may be available for dynamic TDD (e.g., in NR), for example, to ensure high reliability of some services. In another example, eIMTA enhancements may not account for beam aspect in NR.

NR may support dynamically assigned DL and UL transmission directions, for example, for data on a per-slot basis (e.g., in a TDM manner). More dynamic and efficient interference mitigation schemes may include, for example, sensing schemes (e.g., listen-before-talk-like), power control, coordinated transmission and link adaption. Procedures may be provided for reliable and efficient cross-link interference measurement and reporting, for example, to support efficient interference mitigation in NR dynamic TDD deployment.

Data traffic patterns in different cells may be adapted. In an example, a (e.g., each) Transmission-Reception Point (TRP) that may be serving a (e.g., one) cell, may (e.g., dynamically) switch its DL/UL directions. Different transmission directions in neighboring cells may cause, for example, cross-link interference (CLI). For example, a TRP transmitting in the UL may interfere with a TRP transmitting in the DL. As another example, the TRP transmitting in the DL may interfere with the TRP transmitting in the UL.

Figure 2:
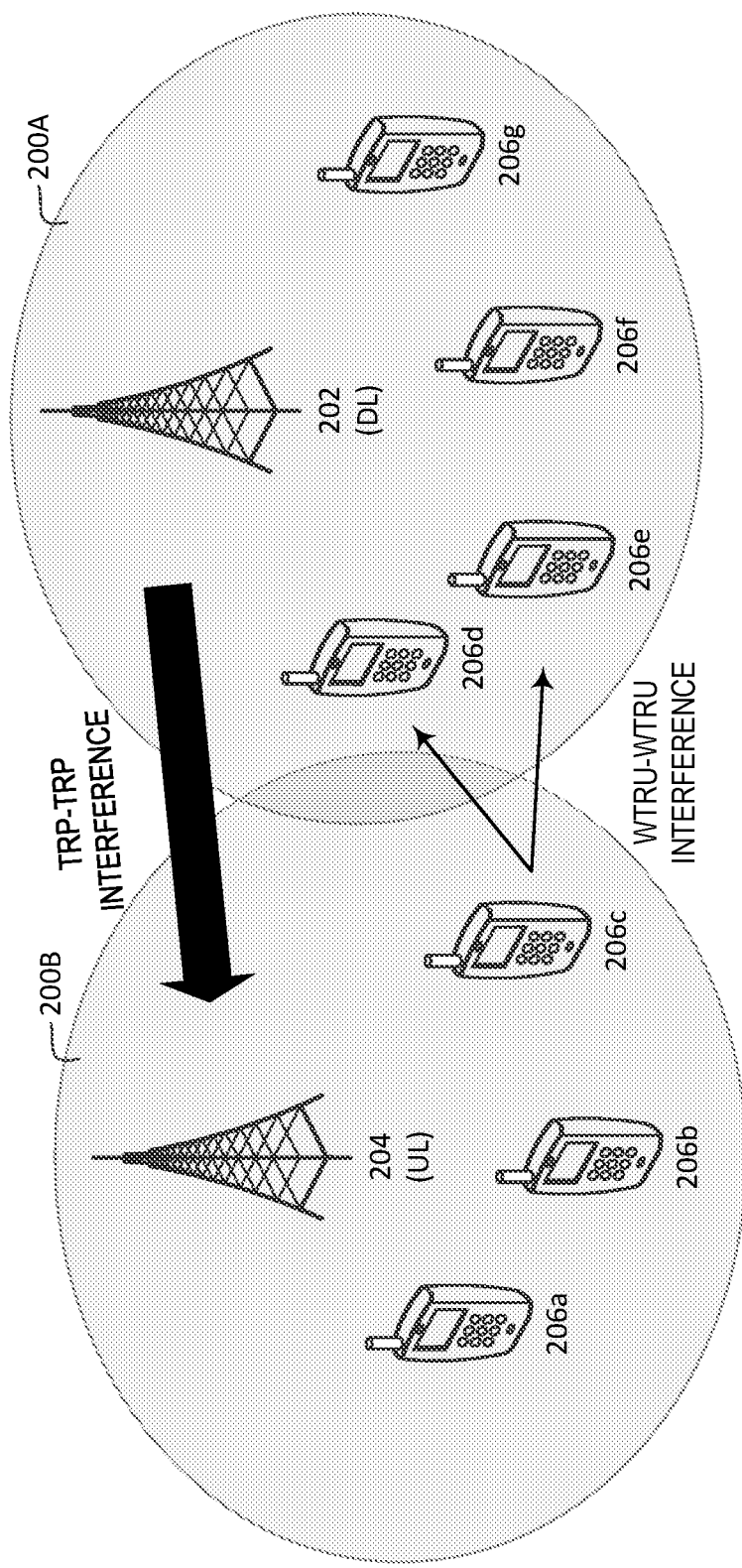
FIG. 2 is an example of interference scenarios.

FIG. 2 is an example of TRP-TRP interference and WTRU-WTRU interference scenarios. FIG. 2 shows examples of interference that may occur when a first TRP (e.g., TRP 202) transmits on DL while a second TRP (e.g., TRP 204) receives on UL. The second TRP may receive a signal from the first TRP due to a DL transmission of the first TRP. The signal from the first TRP may interfere with and/or cause large interference (e.g., TRP-TRP interference) to UL signals from scheduled UL WTRUs. One or more WTRUs (e.g., WTRUs 206d, 206e, 206f, 206g) may be in a first cell 200A that may include the first TRP 202. One or more WTRUs (e.g., WTRUs 206a, 206b, 206c) may be in a second cell 200B that may include the second TRP 204. One or more WTRUs 206d, 206e in the first cell 200A with the first TRP 202 (e.g., close to the cell boundary) may receive interference (e.g., large interference e.g., from UL transmissions of one or more WTRUs (e.g., WTRU 206c) in the second cell 200B with the second TRP 204. The interference from UL transmission of WTRUs in a neighboring cell may be represented as WTRU-WTRU interference.

Errors due to interference may be handled, for example, via HARQ. A network may (e.g., also) manage TRP-TRP interference and/or WTRU-WTRU interference statically/semi-statically, for example, via multiple observations of failed transmissions. A fast mechanism may be provided to handle TRP-TRP interference and/or WTRU/WTRU interference (e.g., for services requiring low latency and high reliability). A WTRU-WTRU CLI may be (e.g., highly) dynamic, for example, due to several factors, such as one or more of WTRU mobility, number of interfered WTRUs, time-varying channels for cross links, WTRU type (e.g., interference cancellation capabilities), transmission power control (TPC), dynamic transmit/receive beam, etc. WTRU-WTRU interference may become more severe, for example, when WTRUs may be close to a cell edge. For example, WTRU-WTRU interference may have a greater effect on a WTRU that is close to a cell edge and/or may be more difficult for the network to mitigate when near cell edge due to inter-cell interference scenarios. A network-aided static procedure may not handle dynamic WTRU-WTRU interference. Dynamic interference measurement and signaling may handle time-varying interference and may permit fast adaptation to an instantaneous traffic load on DL/UL in NR dynamic TDD deployment.

A victim WTRU (e.g., a WTRU subjected to interference by a "perpetrator" or an "aggressor" WTRU) may, for example, send an interference measurement reference signal (IMRS). An IMRS may be transmitted by a WTRU (e.g., the victim WTRU), for example, before receiving a DL payload.

A "victim" WTRU (e.g., a WTRU subjected to interference by a "perpetrator" or "aggressor" WTRU) may transmit an interference measurement reference signal (IMRS), for example, before receiving DL payload. A victim WTRU may indicate a priority of DL data in an IMRS. A network may selectively configure WTRUs (e.g. those more likely to be subject to interference) to transmit IMRS and/or victim and/or aggressor WTRUs may determine when to transmit IMRS (e.g. based on reference signal received power (RSRP) of one or more transmission/reception points (TRPs). An aggressor WTRU may measure an IMRS transmitted by potential victim WTRUs. An aggressor WTRU may adjust UL transmission power (TP) based on a detected IMRS, e.g., to avoid excessive interference to a victim WTRU. An aggressor WTRU may report information, such as a TP adjustment, to a network.

A sensing interval may be introduced in a subframe structure for CLI sensing, for example. The sensing interval may be introduced to facilitate dynamic interference sensing/measurement.

Figure 3:
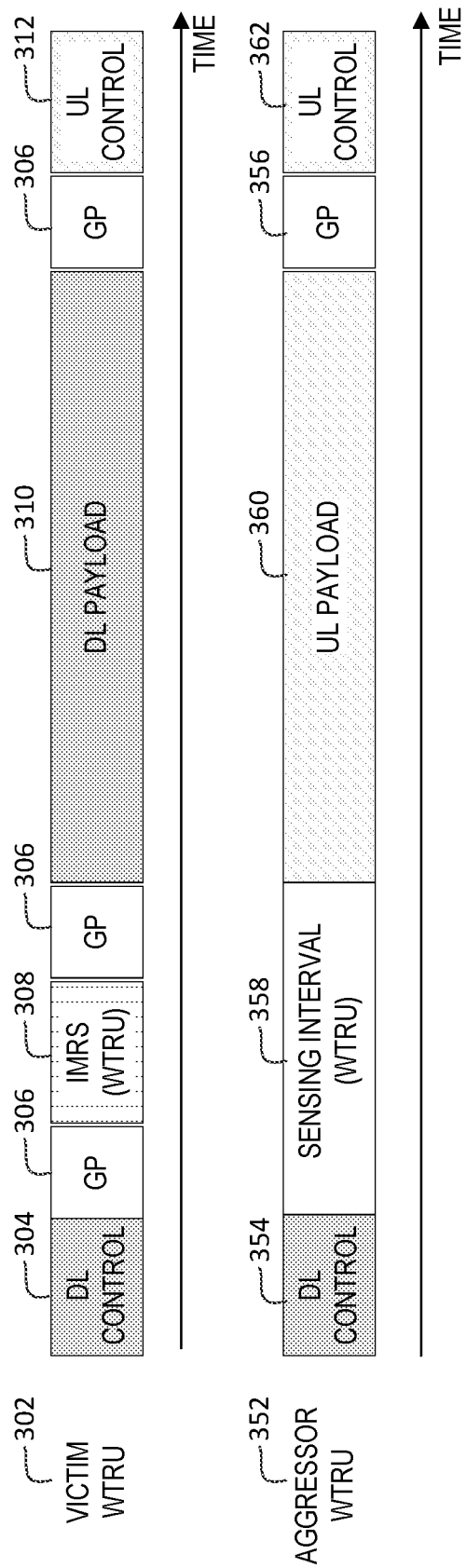
FIG. 3 is an example of a sensing interval and an interference measurement reference signal.

FIG. 3 is an example of a sensing interval and an interference measurement reference signal. In an example, a subset of resources may be reserved for IMRS transmission and/or measurement during a frame (e.g., LTE frame of 10 ms) or multiple aggregated NR slots (e.g., several milliseconds). A victim WTRU 302 may receive a DL payload from a serving TRP. The victim WTRU 302 may transmit an IMRS 308 between receiving DL control 304 and one or more DL payload fields/intervals 310. A guard period (GP) 306 may be before and after the IMRS 308 and after the DL payload 310. A potential aggressor WTRU 352 may monitor IMRS transmissions from one or more potential victim WTRUs, for example, during a sensing interval 358 before transmitting UL data (e.g., UL payload 360). The sensing interval 358 may follow receipt of DL control 354 and may be before transmission of the UL payload 360. A GP 356 may be between transmission of the UL payload 360 and the UL control 362. In an example, DL control 304, 354 and/or UL control 312, 362 may be aligned between neighboring cells, e.g., to avoid CLI. Example implementations may (e.g., also) be applicable to CLI management for control data.

A potential victim WTRU may be configured to transmit an IMRS, for example, with one or more of the following signal characteristics: (i) time, e.g., an offset with respect to a frame, a subframe, and/or a slot timing; (ii) frequency, e.g., physical resource block (PRB); (iii) signal sequence type, e.g., Zadoff-Chu, Gold, etc. and/or (iv) sequence parameter, e.g., different root/cyclic shift for Zadoff-Chu sequence.

Different victim WTRUs may be configured to send their respective IMRSs, for example, using orthogonal OFDM symbols. Symbols may be configured by a network, for example, via L1 control (e.g., group PDCCH or WTRU-specific PDCCH) or via higher-layer signaling. Different victim WTRUs may (e.g., alternatively) be configured with orthogonal PRBs for IMRSs, such as a different combination type of sounding reference signal (SRS) defined in LTE. Different victim WTRUs may (e.g., alternatively) be configured with orthogonal/nearly orthogonal reference sequences, which may be multiplexed in the same subset of time-frequency resources for IMRS (e.g., in a code division multiplexing (CDM) manner). A victim WTRU may (e.g., also) be configured, for example, with any combination of techniques for IMRS transmission.

An IMRS may (e.g., also) carry a data payload. The data payload in the IMRS may include an identity of a victim WTRU and/or other characteristics associated with the victim reception, such as a set of PRBs associated with a transmission, TRP being utilized by the victim WTRU, beam index for a transmission, etc.

A victim WTRU may select resources for IMRS transmission, for example, based on scheduling information.

A victim WTRU may (e.g., first) decode a DL control part. The victim WTRU may obtain its scheduling information, e.g., assigned PRBs, based on the decoding of the DL control. For example, the DL control may indicate assigned PRBs associated with the victim WTRU. The victim WTRU may be configured to send an IMRS on one or more of the assigned PRBs indicated by the DL control. The IMRS may allow an aggressor WTRU to more accurately estimate a potential CLI it may create to PRBs used by a victim WTRU.

Characteristics of an IMRS signal may, for example, depend on an allocation bandwidth. In an example, an IMRS may be configured to span an entire bandwidth of an allocation. An IMRS signal may support variable length. In an example, a victim WTRU may be configured to repeat all or part of an IMRS signal (e.g., in a predefined way), for example, to fill a bandwidth. For example, a victim WTRU may send (e.g., repeat) an IMRS signal multiple times in an allocation. Repetition rules, which may be pre-defined, may be known to victim and aggressor WTRUs.

In an example, a victim WTRU may be configured to repeat an IMRS signal over blocks of contiguous PRBs (e.g., 6 PRBs). A starting PRB may be taken from a subset of predefined values, which may (e.g., effectively) define subchannels. Repeating an IMRS over blocks of contiguous PRBs may simplify detection for an aggressor WTRU.

A victim WTRU's transmission power for IMRS may be, for example, pre-configured or semi-statically configured by a network. For example, the network may pre-configure a transmission power for an IMRS from the victim WTRU. As another example, the network may configure the transmission power for an IMRS based on interference (e.g., such as WTRU-WTRU interference, TRP-TRP interference, and/or CLI). Knowledge of a victim WTRU's transmission power may, for example, facilitate accurate estimation of CLI at an aggressor WTRU. The network and/or the aggressor WTRU may estimate CLI based on the victim WTRU's transmission power for IMRS. For example, the network and/or the aggressor WTRU may determine a pathloss to the victim WTRU, for example, based on the measured IMRS, RSRP, and/or its own transmission power. In an example, transmission power of a victim WTRU for IMRS transmission may be pre-configured/semi-statically configured, for example, by a network, e.g., via higher-layer signaling such as via SIB or dedicated RRC signaling. The network and/or the aggressor may then estimate (e.g., based on the aggressor WTRU transmit power and/or path loss) an amount of interference it may be causing.

In an example, the transmission power for IMRS of a victim WTRU may be a function of and/or dependent on the RSRP of the serving cell. For example, the victim WTRU may set its transmission power as a function of the RSRP of the serving TRP. The transmission power of the IMRS may be set higher when the RSRP of the TRP is lower. For example, the transmission power (in dBm) of the IMRS may be represented as an offset from the RSRP (e.g., set as Offset-RSRP in dBm). The offset from the RSRP may be signaled by downlink control information and/or higher layer signaling (e.g., RRC). By setting the IMRS transmission power higher when RSRP is relatively low, the WTRU may attempt to ensure that the amount of power reduction applied by an aggressor WTRU takes into account a tolerable amount of interference at the WTRU.

A victim WTRU may indicate a priority of DL data in an IMRS. NR may support different services simultaneously. The victim WTRU may determine the priority of the DL data. A (e.g., each) service may have its own set of requirements, such as high reliability, low latency and spectral efficiency, for example. Different service types may (e.g., also) have different priorities. In an example, a URLLC service may require a very low bit error rate (BER) and (e.g., hence) may tolerate less interference. An eMBB service may be robust to relatively large interference, for example, due to a wide allocated bandwidth, a more robust modulation and coding scheme (MCS) and/or tolerance to larger latency allowing HARQ and repetition.

A victim WTRU may indicate priorities associated with different services of different scheduled WTRUs. A victim WTRU may indicate priorities associated with different services of different scheduled WTRUs by using one or more characteristics of an IMRS (e.g., as discussed herein). A victim WTRU may indicate a priority associated with a DL payload to be received by the victim WTRU to one or more aggressor WTRUs. In an example, a victim WTRU may be configured to indicate a priority of its DL payload, for example, by selecting different signal sequence types and/or different sequence parameters (e.g., root, cyclic shift, length and repetition patterns). The different signal sequence types and/or different sequence parameters may be used to formulate the IMRS transmission in order to indicate the priority of the DL payload to the aggressor WTRU.

In an example, the signal sequence (e.g., the IMRS) may be characterized by a pattern of on-off transmissions (e.g., a repetition of a base sequence). The base sequence (e.g., of length N) may include a Zadoff-Chu sequence with specific root, cyclic shift, etc. The WTRU may be configured with a base sequence transmission pattern (e.g., of length M) for each priority level. For instance, in the case of 4 priority levels, the WTRU may be configured with the example base sequence repetition pattern shown in Table 1 (e.g., where 0 indicates no transmission of the base sequence and 1 represents a transmission of the base sequence (e.g., in time)):

TABLE 1

| Priority | IMRS Sequence (length M = 6) |
| --- | --- |
| 0 | 011011 |
| 1 | 110011 |
| 2 | 011101 |
| 3 | 101011 |

As shown in Table 1, the IMRS sequence length may include M=6 base sequence each of length N. The pattern may be designed to ensure that there is a minimum number of transmissions of base patterns, for example, which may ensure that proper energy measurements can be performed by the aggressor WTRU. In the above example, each pattern includes 4 transmissions of the base pattern; this approach (same number of transmission of base patterns) may simplify the energy detection/RSSI/RSRP measurement (e.g., estimate) as the same energy is transmitted regardless of the associated priority. Other sequence designs may also be considered. The aggressor WTRU may be configured to detect the energy of the pattern and then determine the associated priority, for example, based on the correlations indicated in Table 1.

In an (e.g., another) example, priorities (e.g., associated with a DL payload) may be (e.g., explicitly) indicated using one or more indices, for example, as shown in Table 2.

TABLE 2

| Reliability (High/Medium/ Low) | Latency (High/Medium/ Low) | Robustness to Interference (High/Medium/Low) | Priority Index |
| --- | --- | --- | --- |
| High | Low | Low | 1 |
| High | Medium | Low | 2 |
| High | High | Low | 3 |
| ... | ... | ... | ... |
| Medium | Low | Low | M |
| ... | ... | ... | ... |
| Low | High | High | N |

Indices may be represented, for example, by a number of bits. The number of bits may be pre-configured by a network. Bits indicating priority may be modulated and coded, for example, using a pre-configured MCS. Bits may be transmitted on a subset of resource elements (REs). The subset of REs may be reserved by or for an IMRS.

A victim WTRU, e.g., before receiving a DL payload, may not know a priority of its DL payload. In an example, a victim WTRU may be configured to determine a priority index of a DL payload. The priority index of the DL payload may be indicated in DL control information (DCI) by a network. A priority (e.g., associated with the victim WTRU) may be determined by an aggressor WTRU.

A victim WTRU may select a transmit beam for an IMRS. The transmit beam for an IMRS may be symmetric to a receive beam.

NR may support beamforming transmissions. A victim WTRU may be configured with different beams for IMRS transmission. The victim WTRU may configure different beams using beam sweeping. The victim WTRU may configure different beams to estimate (e.g., better estimate) a CLI between victim and aggressor WTRUs. An aggressor WTRU may be configured to receive multiple copies of an IMRS that may be associated with different transmit beams. For example, each IMRS may be associated with a respective transmit beam. An aggressor WTRU may be configured with multiple receive beams. An aggressor WTRU may estimate and report a CLI. For example, an aggressor WTRU may estimate CLI based on the worst CLI scenario (e.g., when a victim's transmit beam is aligned with an aggressor WTRU's receive beam). This approach may use more resources (e.g., lower spectral efficiency) and may have lower energy efficiency.

In an example, a victim WTRU may be configured with a transmit beam that is symmetric to a receive beam for a scheduled DL payload. A victim WTRU may decode its WTRU-specific PDCCH and obtain or determine a receive beam index that may be used to receive a DL payload. In an example, a victim WTRU may select a transmit beam index that may yield a transmit beam in alignment with a receive beam. In another example, a victim WTRU may select a transmit beam that is the same as the one it may use to receive DL data. A victim WTRU may use a transmit beam to send an IMRS. This may, for example, along with configuring an aggressor WTRU's receive beam, enable an aggressor WTRU to accurately estimate a potential CLI, which may reduce the possibility of over-estimating or under-estimating the CLI.

A network may selectively configure a subset of victim WTRUs transmitting IMRS. The subset of victim WTRUs may include one or more victim WTRUs. Configuring a large number of WTRUs to transmit IMRS may cause an excessive amount of network signaling overhead and an excessive amount of resource usage for IMRS.

Figure 4:
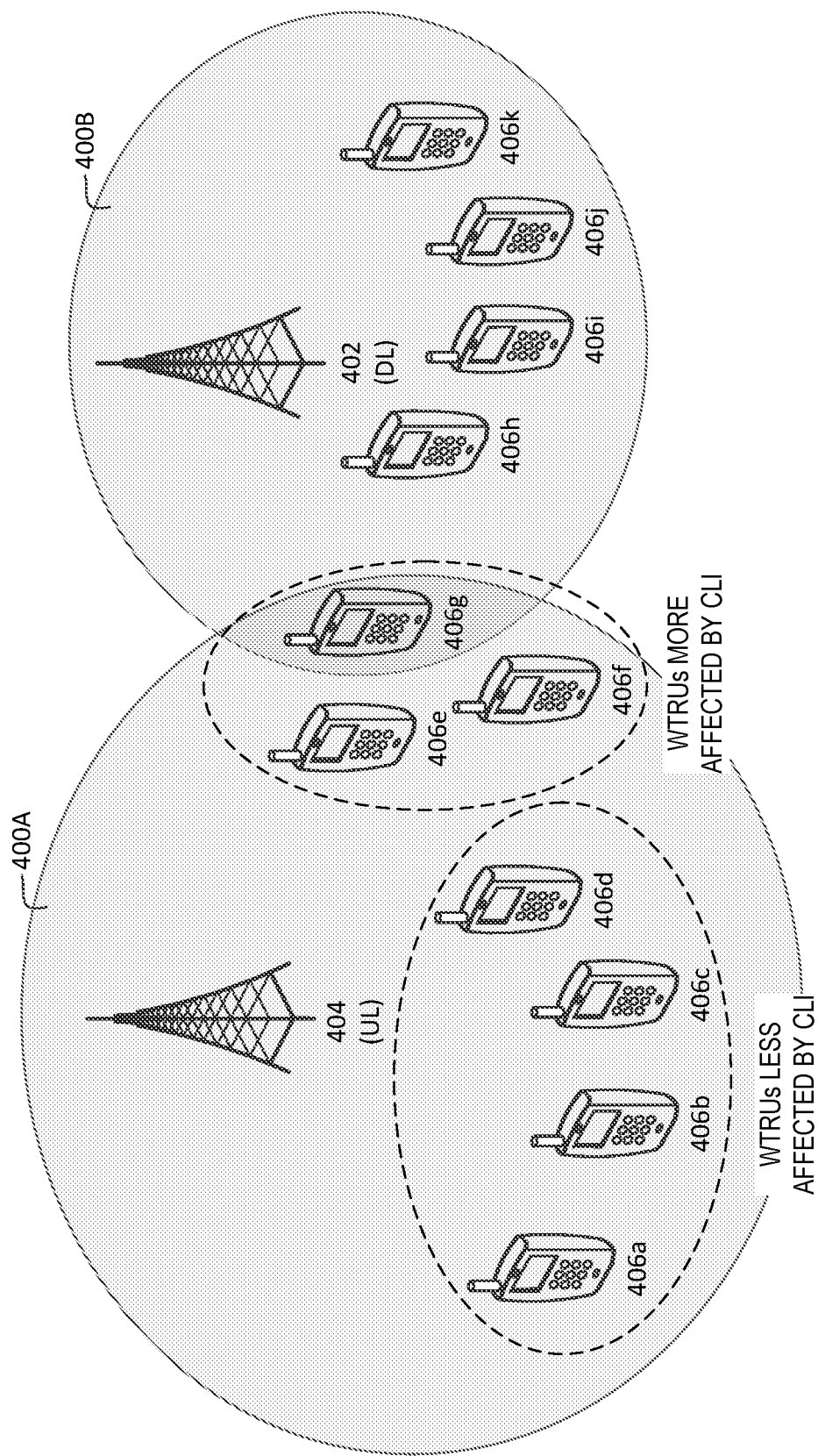
FIG. 4 is an example of selective configuration of WTRUs transmitting IMRS.

FIG. 4 is an example of selective configuration of WTRUs transmitting IMRS. A first cell 400A may be located adjacent to a second cell 400B. The first cell 400A and the second cell 400B may overlap. A first TRP 404 may be within the first cell 400A. A second TRP 402 may be within the second cell 400B. The first TRP 404 may receive and/or transmit in the UL and the second TRP 402 may receive and/or transmit in the DL. WTRUs 406a, 406b, 406c, 406d, 406e, 406f may be within the first cell 400A. WTRUs 406h, 406i, 406j, 406k may be within the second cell 400B. WTRU 406g may be within the first cell 400A and the second cell 400B.

In an example (e.g., as shown in FIG. 4), subsets of WTRUs close to a cell edge may be exposed to CLI more severely than WTRUs close to the center/TRP of a cell. For example, WTRUs 406e, 406f, 406g may experience worse CLI than WTRUs 406a, 406b, 406c, 406d. WTRUs close to cell center (e.g., such as WTRUs 406a, 406b, 406c, 406d) may be more immune to CLI, for example, due to large transmission power and path loss disparities between a serving TRP (e.g., TRP 402) and aggressor WTRUs in a neighboring cell (e.g., the second cell 400B). Overhead associated with network signaling and resource usage may be reduced. In an example, a subset of WTRUs may be configured (e.g., by a network) to send IMRS, for example, based on a WTRU higher layer measurement (e.g., reference signal received power (RSRP)). For example, a WTRU may measure an RSRP of one or more respective TRPs. The WTRU may determine whether to send an IMRS, for example, based on the measured RSRP. In an example, WTRUs may be configured by a network to report their RSRP measurements of neighboring cells, e.g., on a periodic basis and/or on an event-triggered basis. A WTRU may report an RSRP measurement associated with a TRP to the network. A WTRU may report an RSRP measurement, for example, when one or more of the following conditions are met: (i) a serving cell may become worse than a (e.g., first) preconfigured threshold; (ii) a neighboring cell may become better than a (e.g., second) preconfigured threshold; and/or (iii) a difference between a serving cell and a neighboring may become less than a (e.g., third) threshold.

In an (e.g., another) example, a network may receive measurement report(s) from one or more WTRUs. The measurement report(s) may be associated with a possible handover request. The network may configure a subset of the one or more WTRUs to send an IMRS upon receiving the measurement report(s) from the one or more WTRUs.

A victim WTRU may determine whether to transmit an IMRS, for example, based on a TRP RSRP. A victim WTRU may determine a property of the IMRS to be transmitted. The victim WTRU may determine the property of the IMRS, for example, based on the TRP RSRP. For example, a victim WTRU may be configured to determine when to transmit an IMRS based on an RSRP of a TRP associated with the victim WTRU. In an example, a victim WTRU may be configured to transmit an IMRS, for example, when the victim WTRU determines that it is located at a cell edge. The victim WTRU may determine that it is located at a cell edge when it determines that it is located near a boundary of the cell. In an example, a WTRU may be configured with an RSRP threshold, e.g., $RSRP_{IMRSTh}$. A WTRU may be configured to transmit IMRS, for example, (e.g., only) when a measured RSRP from a TRP is below a configured threshold, e.g., $RSRP<RSRP_{IMRSTh}$.

A victim WTRU may (e.g., additionally or alternatively) determine to transmit an IMRS, for example, when the victim WTRU may detect another TRP. For example, a victim WTRU may determine to transmit an IMRS when an RSRP of a detected TRP exceeds a threshold. As another example, a victim WTRU may determine to transmit an IMRS when an RSRP of a detected TRP is close to (e.g., within +/−10% of) an RSRP of a TRP associated with the victim WTRU. For example, a WTRU may be associated with a first TRP (e.g., $TRP_A$) and may detect a second TRP (e.g., $TRP_B$). The WTRU may measure the RSRP of the first TRP and the second TRP, e.g., to obtain $RSRP_A$ and $RSRP_B$. In an example, the WTRU may determine to transmit an IMRS, for example, when one or more of the following may be true: (i) $RSRP_B$ may be above a preconfigured threshold, $RSRP_{IMRSThB}$ (e.g., $RSRP_B>RSRP_{IMRSThB}$) and/or (ii) $RSRP_A$ and $RSRP_B$ may be within a certain configured range of each other (e.g., $|RSRP_A-RSRP_B|<R_{Th}$).

A similar approach may be used for an aggressor WTRU to determine, for example, when to monitor for IMRS signals.

In an example, the victim WTRU may determine a property of the IMRS based on an RSRP of a TRP that the victim WTRU is associated with. The property may include a sequence parameter and/or other characteristic(s) of the IMRS described herein. For example, the victim WTRU may select a first sequence parameter when the RSRP of the TRP is below a threshold and a second sequence parameter when the RSRP of the TRP is above a threshold. The property of the IMRS may be used by the aggressor WTRU to determine the appropriate amount of power reduction. A tolerable amount of interference may depend on the RSRP of the serving TRP.

An aggressor WTRU may receive an IMRS from a victim WTRU. The aggressor WTRU may measure the IMRS. The aggressor WTRU may report transmit power control. For example, an aggressor WTRU may be configured to measure one or more IMRS received from one or more potential victim WTRUs. The aggressor WTRU may measure the one or more IMRS during a sensing interval defined in a frame (e.g., example shown in FIG. 3). The aggressor WTRU may measure the RSRP and/or a pathloss of the one or more IMRS. The aggressor WTRU may determine CLI and/or a transmission power (e.g., to avoid creating too much interference) associated with each of the one or more IMRS. An aggressor WTRU may be pre-configured (e.g., via RRC signaling or via a specification) with a subset of signals and/or sequence types to measure (e.g., with associated characteristics). For example, a WTRU may be configured (e.g., by a network) to measure a set of Zadoff-Chu sequences of a specific root.

An aggressor WTRU may (e.g., also) determine a receive power for a (e.g., each) received signal, e.g., RSRP-like. An aggressor WTRU may (e.g., also) determine an identity of a victim WTRU and its associated characteristics, e.g., priority of DL payload, for example, by using one or more of the signal characteristics.

An aggressor WTRU may determine a priority associated with the aggressor WTRU (e.g., of its UL data). The aggressor WTRU may determine the priority based on DCI and/or logical channels (e.g., logical channel prioritization). An aggressor WTRU may receive a DCI (e.g., before a sensing interval and UL data transmission). In an example, an aggressor WTRU may determine a priority of its UL data based on a DCI and may further determine an amount of power reduction to apply. For example, the WTRU may be indicated in the DCI that the transmission is of the high(est) priority and that no power reduction should be applied. In an example, an aggressor WTRU may (e.g., additionally or alternatively) determine a priority, for example, based on a priority associated to one or more logical channels. The prioritization of logical channels may be determined by a medium access control (MAC) layer. The prioritization of logical channels may be configured, for example, by higher-layer signaling (e.g., based on pre-configured rules). In an example, the aggressor WTRU may determine the priority based on the type of grant. For example, the aggressor WTRU may determine priority based on whether the grant is a dynamic grant (e.g., scheduled by DCI), a semi-persistent scheduling grant, or a non-scheduled transmission.

An aggressor WTRU may select one or more receive beams that may be symmetric to one or more transmit beams. An aggressor WTRU may be configured to make measurements, for example, using a beam the aggressor WTRU may be scheduled (e.g., in a DCI) or determine to transmit with during a UL payload transmission. Measuring on a beam that is scheduled for an UL transmission may be based on, for example, symmetry and observation that energy transmitted and received by the same beam may have similar propagation characteristics. Measuring on a beam that is scheduled for an UL transmission, e.g., along with a victim WTRU's transmit beam selection, may emulate CLI interference from an aggressor WTRU's UL transmission to a victim WTRU's DL reception.

An aggressor WTRU may receive over multiple beams. In an example, an aggressor WTRU may be configured to make measurements (e.g., IMRS measurements) across multiple beams. This may be performed, for example, when an IMRS may be transmitted over multiple OFDM symbols. An aggressor WTRU may process multiple measurements (e.g., to average them or use the largest received signal).

An aggressor WTRU may adjust UL transmission power, for example, based on a detected IMRS, e.g., to avoid causing excessive interference for a victim WTRU. In an example, an aggressor WTRU may be configured to adjust (e.g., reduce) its UL transmission power, for example, when it detects presence of one or more victim WTRUs (e.g., based on IMRS measurement). An adjustment of UL transmission power may include, for example, a power backoff and/or a reduction to a maximum power level. An aggressor WTRU may estimate a received power of a received IMRS, e.g., RSRP-like. An aggressor WTRU may determine a priority of the DL payload of the victim WTRU. In an example, a WTRU may be configured with a predefined table/matrix, which may define a relationship between a level of power backoff and/or a maximum power level and the characteristics of a victim WTRU's DL payload, e.g., priority and/or interference level.

Table 3 shows an example predefined table/matrix that defines a relationship between priority, interference, power backoff, and maximum power level, where ax may denote a power backoff indicator (e.g., a multiplicative factor). The power back off indicator may take, for example, a value in a set such as {1, 0.8, 0.6, 0.4, 0.2, 0}, where "0" may indicate an aggressor WTRU may give up a UL transmission opportunity (e.g., to avoid CLI). Additional levels of RSRP and priority of DL payload may be configured (e.g., by a network). Additional levels of power backoff indicator may be configured. A power backoff and/or maximum power level indicator may take other forms, such as an additive factor (e.g., taking values in decibel (dB)). For example, an aggressor WTRU may perform TPC using $P'_L = P_L - \alpha_X$.

TABLE 3

| RSRP of CLI (High/Medium/Low) | Priority index of DL Payload | Power Backoff Factor | Maximum power level (dBm) |
| --- | --- | --- | --- |
| High | 1 | $\alpha_1$ | $P_{max1}$ |
| High | 2 | $\alpha_2$ | $P_{max2}$ |
| High | 3 | $\alpha_3$ | $P_{max3}$ |
| ... | ... | ... | ... |
| Medium | 1 | $\alpha_M$ | $P_{maxM}$ |
| ... | ... | ... | ... |
| Low | 3 | $\alpha_N$ | $P_{maxN}$ |

In another example, an aggressor WTRU may be configured to apply a power reduction, for example, when a priority of a victim WTRU TRP transmission may be (e.g., is) higher than a priority of an aggressor WTRU's transmission. An amount of power backoff and/or a maximum power level may depend on, for example, an RSRP of an IMRS (e.g., as measured by an aggressor WTRU). In an example, an amount of power backoff may be pre-configured for a given range of RSRP. Backoff may be indexed in a table, for example, as shown by an example in Table 4.

TABLE 4

| IMRS RSRP (dBm) | Power backoff (dB) | Maximum power level (dBm) | Index |
| --- | --- | --- | --- |
| −40 < X ≤ −30 | 0 | −10 dBm | 0 |
| −30 < X ≤ −20 | 3 dB | −20 dBm | 1 |
| ... | ... | ... | ... |
| −10 < X | infinity (DTX) | −infinity (dBm) | N − 1 |

The power reduction applied by the aggressor WTRU may depend (e.g., alternatively or additionally) on a detected property of the IMRS. For example, if the victim WTRU determines the IMRS property as a function of the RSRP to its serving TRP, the aggressor WTRU may determine the power reduction to apply implicitly based on that and/or other properties of the IMRS. For example, the maximum power level may be set to a first value when a first property of the IMRS is detected, and the maximum power level may be set to a second value when a second property of the IMRS is detected. The second value may be lower than the first value, for example, by an offset.

An aggressor WTRU may report a transmission power (TP) adjustment and/or additional information to a network. In an example, an aggressor WTRU may, e.g., upon detecting the presence of an IMRS and its associated information (e.g., additional information such as victim WTRU ID, neighboring TRP ID, beam ID, DL payload priority) may be configured to report information to a network. The reported information may include a TP adjustment (e.g., an amount of power reduction, which may include zero power). The aggressor WTRU reporting information may allow a network to (e.g., better) perform data detection and/or demodulation. In an example, an aggressor WTRU may be configured to send information to a network using, for example, a PUCCH part (e.g., example shown in FIG. 3). An aggressor WTRU may report its TP adjustment and/or power backoff, for example, using an index as described herein.

An aggressor WTRU may determine a priority associated with a victim WTRU based on information from a network. The priority associated with the victim WTRU may be a priority of a victim WTRU's DL transmission. For example, the aggressor WTRU may be configured to determine the priority associated with the victim WTRU based on network signaling. The aggressor WTRU may receive an indication from the network of the priority associated with the victim WTRU (e.g., the priority of the victim WTRU's DL transmission). The network may send the indication of the priority associated with the victim WTRU, for example, via the DCI, when providing a scheduling grant to the aggressor WTRU. Sending the indication of the priority associated with the victim WTRU via DCI may include coordination between two or more base stations (e.g., between two gNB) across the Xn (or X2 in LTE) interface.

In an example, the gNB scheduling the victim WTRU(s) may indicate, via the Xn interface, the priority of DL assignments to one or more WTRUs associated to the PRBs or set of PRBs. The indication of the priority of DL assignments may be provided on a regular basis, or when the gNB determines that there is significant interference. The gNB scheduling the aggressor WTRU may determine the priority of one or more victim WTRUs associated to the PRBs over which it schedules the aggressor WTRU. The gNB scheduling the aggressor WTRU may indicate a priority index on the DCI. The priority index may indicate the priority of the one or more victim WTRUs.

In another example, an aggressor WTRU may be configured to determine the priority of the victim WTRU directly from the victim WTRU's gNB. For example, the aggressor WTRU may monitor the victim WTRU's gNB for indications of downlink assignment priority levels. The aggressor WTRU may be configured to monitor a specific neighbor gNB for such signals/indications of downlink assignment priority levels. The aggressor WTRU may receive downlink priority indications, for example, associated to one or more PRBs from the neighbor gNB. In an example, a downlink priority indication may be carried in a DCI (e.g., a specific DCI) for which the RNTI is common or known to the aggressor WTRU (e.g., via RRC configuration). The specific DCI may include, for example, priority indications associated to sets of PRBs.

Systems, methods, and instrumentalities have been disclosed for dynamic interference management in NR dynamic TDD systems. A "victim" WTRU (e.g., a WTRU subjected to interference by a "perpetrator" or "aggressor" WTRU) may transmit an interference measurement reference signal (IMRS), for example, before receiving DL payload. A victim WTRU may indicate a priority of DL data in an IMRS. A network may selectively configure WTRUs (e.g., those more likely to be subject to interference) to transmit IMRS and/or victim and/or aggressor WTRUs may determine when to transmit IMRS (e.g., based on reference signal received power (RSRP) of one or more transmission/ reception points (TRPs). An aggressor WTRU may measure an IMRS transmitted by one or more potential victim WTRUs. An aggressor WTRU may adjust UL transmission power (TP) based on a detected IMRS, e.g., to avoid excessive interference to a victim WTRU. An aggressor WTRU may report information, such as a TP adjustment, to a network.

Processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A first wireless transmit/receive unit (WTRU) comprising:
    a processor configured to:
        determine a first priority associated with the first WTRU based on one or more of downlink control information (DCI) or a logical channel prioritization;
        measure an interference measurement reference signal (IMRS) transmission, wherein the IMRS transmission is received from a second WTRU;
        determine a second priority associated with the second WTRU based on the IMRS transmission;
        determine that the second priority is greater than the first priority; and
        adjust an uplink transmission power of the first WTRU based on the measurement of the IMRS transmission and the determination that the second priority is greater than the first priority.

2. The first WTRU of claim 1, wherein the second priority associated with the second WTRU is indicated in the IMRS transmission.

3. The first WTRU of claim 1, wherein the adjustment of the uplink transmission power comprises a reduction of the uplink transmission power.

4. The first WTRU of claim 3, wherein an amount that the uplink transmission power is reduced is based on one or more of the measurement of the IMRS transmission or a receive power determined based on the measurement of the IMRS transmission.

5. The first WTRU of claim 1, wherein the processor is further configured to determine one or more of:
    an identity of the second WTRU and one or more characteristics of the second WTRU based on the IMRS transmission, wherein the second priority is further determined based on the identity of the second WTRU and the one or more characteristics of the second WTRU, or
    a reference signal received power (RSRP) associated with the second WTRU based on the measurement of the IMRS transmission, wherein the uplink transmission power is adjusted based on the RSRP associated with the second WTRU.

6. The first WTRU of claim 1, wherein the first priority is associated with uplink data that is to be sent from the first WTRU, and the second priority is associated with downlink data that is to be received by the second WTRU.

7. A method comprising:
    a first WTRU determining a first priority associated with the first WTRU based on one or more of downlink control information (DCI) or a logical channel prioritization;
    the first WTRU measuring an interference measurement reference signal (IMRS) transmission, wherein the IMRS transmission is received from a second WTRU;
    the first WTRU determining a second priority associated with the second WTRU based on the IMRS transmission;
    the first WTRU determining that the second priority is greater than the first priority; and
    the first WTRU adjusting an uplink transmission power of the first WTRU based on the measurement of the IMRS transmission and the determination that the second priority is greater than the first priority.

8. The method of claim 7, wherein the second priority associated with the second WTRU is indicated in the IMRS transmission.

9. The method of claim 7, wherein the adjustment of the uplink transmission power comprises a reduction of the uplink transmission power.

10. The method of claim 9, wherein an amount that the uplink transmission power is reduced is based on one or more of the measurement of the IMRS transmission or a receive power determined based on the measurement of the IMRS transmission.

11. The method of claim 7, further comprising:
    the first WTRU determining an identity of the second WTRU and one or more characteristics of the second WTRU based on the IMRS transmission, wherein the second priority is further determined based on the identity of the second WTRU and the one or more characteristics of the second WTRU, or
    the first WTRU determining a reference signal received power (RSRP) associated with the second WTRU based on the measurement of the IMRS transmission, wherein the uplink transmission power is adjusted based on the RSRP associated with the second WTRU.

12. A first wireless transmit/receive unit (WTRU) comprising:
    a processor configured to:
        determine a reference signal received power (RSRP) of one or more transmission/reception points (TRPs);
        receive downlink control information (DCI);
        determine to send an interference measurement reference signal (IMRS) transmission based on the determined RSRP;

determine a priority of upcoming downlink data based on the received DCI; and send, to a second WTRU, the IMRS transmission, wherein the IMRS transmission indicates the priority of the upcoming downlink data.

13. The first WTRU of claim 12, wherein the processor is further configured to determine one or more resources for the IMRS transmission based on the received DCI.

14. The first WTRU of claim 12, wherein the processor is further configured to select a transmit beam for the IMRS transmission based on the received DCI.

15. The first WTRU of claim 14, wherein the selected transmit beam is symmetric to a receive beam selected to receive the upcoming downlink data.

16. The first WTRU of claim 12, wherein the processor is further configured to receive the upcoming downlink data from the second WTRU using a receive beam that is selected based on the received DCI.

* * * * *